UNITED STATES PATENT OFFICE.

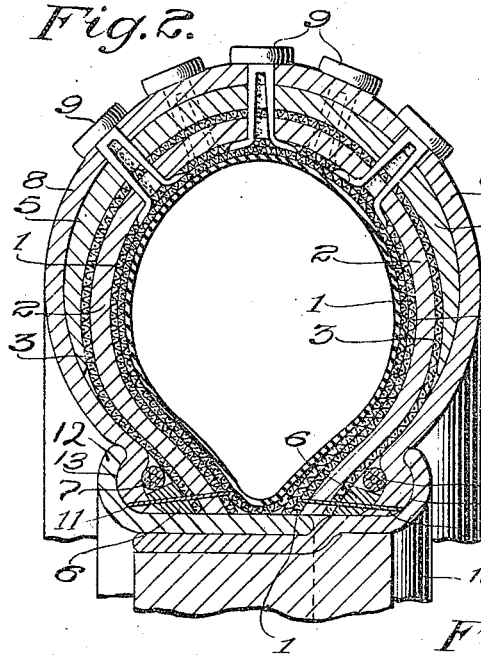
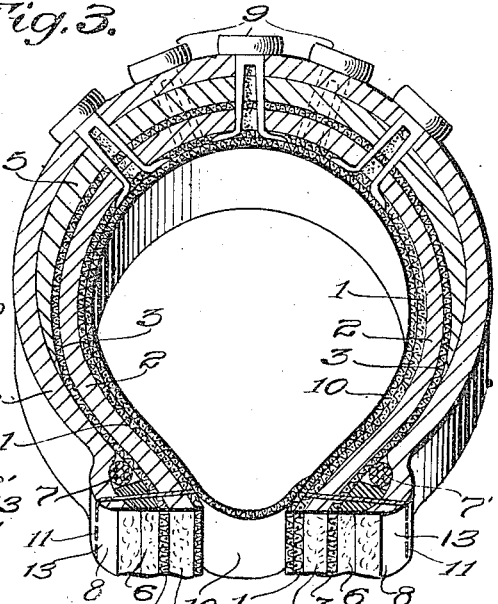
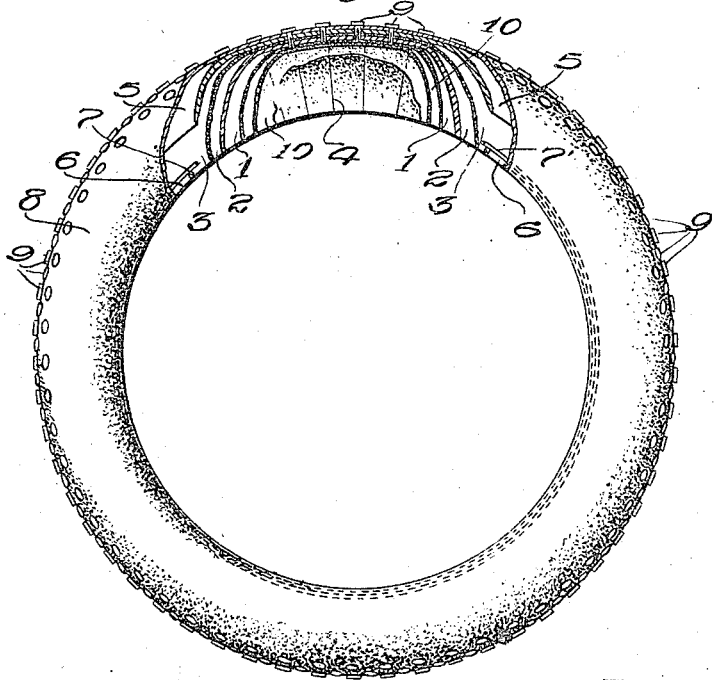

PETER TRUDEAU, OF SANTA ANA, CALIFORNIA.

BUILT-UP PNEUMATIC TIRE.

974,771.   Specification of Letters Patent.   Patented Nov. 1, 1910.

Application filed July 28, 1908. Serial No. 445,795.

*To all whom it may concern:*

Be it known that I, PETER TRUDEAU, a citizen of the United States, residing at Santa Ana, in the county of Orange and State of California, have invented a new and useful Built-Up Pneumatic Tire, of which the following is a specification.

The object of this invention is to provide a pneumatic tire for automobiles and the like, which will be a superior substitute for the india-rubber tires and substitutes therefor, heretofore in use.

Points of superiority aimed at are durability, cheapness, strength, safety, antichafing and antiheating of the pneumatic tube; firmness, non-stretchableness, and superior security against slipping from the clench.

This invention relates to the outside sheath or tire for inclosing the usual inner tube.

No claim is made herein to the specific novel material or method herein specified, as the same are claimed in a copending and continuing application for United States patent on material for and method of making built-up pneumatic tires, Serial Number 585,511, filed October 5th, 1910.

The accompanying drawings illustrate the invention.

Figure 1 is a broken view of a detached tire constructed in accordance with this invention. Fig. 2 is an enlarged cross-section of a fragment of the same clenched on a wheel-rim. The inner tube is shown in place. Fig. 3 is a view of a fragment of the tire detached and without any inner tube.

The tire is constructed of leather, sail-cloth, cement, and wire-cable, and the leather is subjected to specific treatment in order to take out all the stretch, and is then formed over a form, not shown, and thereby given the necessary hollow annular shape, and is afterward allowed to dry while tightly stretched thereon so as to retain its shape. After the completed tire is fully dried, it is subjected to a water-proofing treatment so as to preclude the liability of becoming soft though continually soaked in water for a long period, as may occur in practical use.

The water-proofing treatment consists in soaking the outside of the completed tire in a bath of melted bees-wax, Burgundy pitch, and turpentine, which has previously been brought to a boil, and which, at the time the leather is subjected to the bath has a temperature of about 100° Fahrenheit; the tire being allowed to soak in such bath for about six hours, and being rolled about in the bath of water-proofing material from time to time so as to cover the outside of the tire.

I will now describe the method of preparing the leather before the same is stretched upon the form. The leather preferred is heavy, chrome tanned leather, of say about ¼ inch more or less thickness. The same is to be soaked in a preparation of flax-seed, water and Irish moss, which is thoroughly boiled together before the leather is soaked therein; about equal parts of flax-seed and Irish moss being boiled in the water until it is brought to a syrupy consistency, and allowed to cool to about 100° Fahrenheit. The leather will be placed in the preparation while the same is at a temperature of about 100° Fahrenheit, and will be kept therein until it is thoroughly soft and pliable. Previous to this the leather should be cut into strips of appropriate width to form the tire, and of such lengths as may be available or convenient, and if a single piece of leather is not long enough to go around the tire, two or more pieces should be cemented together to make a strip which will be long enough to extend fully around the tire and lap for cementing together at the ends. The pieces for each strip may be cemented together with any well-known leather cement, and allowed to become set before being soaked.

After the leather strips have been thoroughly soaked and sufficiently softened, the same will be stretched lengthwise by mechanical means, as levers,—not shown,—until all the stretch has been taken out in that direction. Then the strips will be ready to be stretched upon a form, not shown. The form for this purpose may be made in a number of sections in a well-known way; the same being put together and secured by screws and readily detachable from each other so as to be withdrawn from the tire when the tire is completed.

When the leather strips have all been thoroughly softened, then a strip 1, of No. 1 sail-cloth sufficiently long to extend entirely around the circumference of the form and sufficiently wide to extend entirely around the form and to lap over on the inside thereof, and slitted to prevent obstructive creasing, will be applied to the form and lapped on the inner side thereof, allowing one edge of the sail-cloth strip to come approximately to the place where the edge of the tire is to be when completed; the same being in position to firmly rest on the clencher which will fasten the tire to the rim of the wheel when the tire is in use. Then a coating of cement will be applied to the outside of said sail-cloth, and a strip 2 of the soaked leather pieced or unitary, as the case may be, and long enough to extend around the circumference of the form and to overlap to form a splice about four inches or more of lap, and shaved at the ends in the usual way to form an even thickness when spliced, and wide enough to reach around the form from edge to edge of the proposed tire,—will then be applied to said form,—not shown,—and stretched around the same until all the stretch is taken out and the edges of the leather strip come together, or nearly so, at the inside of the form all around the inside circle thereof. Then apply a coating of cement to the outside of the leather strip thus formed, and then apply a second sheet, 3, of No. 1 sail-cloth to the cement-coated leather, and draw the same tight. In each instance the sail-cloth will be slit by slits 4 so that there will be no puckering or creasing of the sail-cloth, and the same can be brought tightly and smoothly into place. This second sheet of sail-cloth will then be covered with a coating of cement and a strip, 5, of the soaked leather sufficiently long to go entirely around the circumference of the tire, and shaved at the end to make a smooth splice, and also shaved to an even edge on each edge, and being of a width to cover a little more than half of the face of the tire from side to side, will then be applied and stretched tightly over the cemented surface.

In each instance the ends of the leather strips will be lapped together and cemented with leather-cement at their ends after they have been thoroughly stretched into place. After the leather strip 5 has thus been spliced in place, the body of the tire thus formed will be coated with cement on the outside, and two circular sole-leather welts 6 of wedge shape in cross-section will be applied at that portion of the tire thus constructed which is to form the open edges of the tire. These welts will be tacked in place temporarily, and then two wire cable rings 7 and 7' which are preferably about ¼ inch in diameter and formed of thin steel wire strands twisted together, are brought against the tire at the edges thereof and against the welts that have been tacked in place. Then the body thus formed will be coated externally with cement, and then the final outside strip 8 of stretched and softened leather will be applied and stretched around the tire and over the wires and wedges, and brought tightly into position.

Then the leathers will be stitched across the opening in the tire to hold the leathers firmly in place temporarily until the same have become dry. When thoroughly dried, the form, not shown, will be removed, and then stud-headed rivets 9 will be driven through and clenched on the inside to form a non-skidding, armored tread for the tire. Then the inside sail-cloth lining or coating 1 will be coated with cement, and then a strip 10 of sail-cloth will be fitted tightly and smoothly inside the tire thus formed, in order to protect the inner rubber tube from the effects of rusting or chafing of the studs.

The inside lining of sail-cloth will lap across the opening to close the same. Then each edge of the hollow tire thus formed will be sewed entirely around through all the thicknesses of leather, excepting the narrower one which does not extend to the edges of the hollow tire, and also through the welt, thus forming a closed edge on each side of the opening through which the form, not shown, has been removed.

11 designates the stitches.

The cable rings 7 and 7' are within the periphery of the rim 12 of the wheel, the welts 6 being still inside of these rings, and said welts and rings serve to thicken the edges of the tire, thereby holding the edges of the outer layer 8 of leather outwardly and forming the clenchers 13 to hook into the rim 12 and hold the tire firmly in place. These metallically reinforced and enlarged clenchers are of great importance in holding the tire rigidly in place. Heretofore it has been the practice to form the clenchers by thickening the vulcanized rubber, thus producing a softer effect as compared to my rigid effect. The sections of canvas serve to hold the leather from stretching and also strengthen the band between the sections of leather. I desire also to call especial attention to the rivets 9. These rivets have two prongs driven entirely through the three leather layers of the tire and clenched. The heads of the rivets are broad and flat so as to set well upon the outer surface of the tire, and the two prongs are held more firmly by the entire body of hard leather than they would be held by one or two thicknesses of the leather.

Thus I have produced a built up tire having the strength and resiliency of three layers of leather thoroughly cemented together so as to form a strong resilient body, without seams or joints, and having clenchers in which the strength and firmness of metallic rings is added to two layers of leather and leather welts with layers of canvas sewed and cemented into a resilient mass of great strength and durability.

I claim:

1. The built-up tire set forth comprising a canvas strip, a non-stretchable leather strip on said canvas strip, cement binding the strips together, a second canvas strip upon the leather strip, a second non-stretchable leather strip of less width than the first leather strip, its edges being tapered, cement securing said second leather strip upon the center of the second canvas strip, a third non-stretchable leather strip containing wax and pitch and cemented upon the second leather strip and the canvas stretched thereunder, rigid means to hold the edges of the last-mentioned leather strip outward to form clenchers, a strip of canvas upon the inner canvas strip and longer at one edge than at the other edge so as to loop over onto the other edge, stitches securing the strips together at the edges, studs extending through the center of all the strips except the last-mentioned strip, and suitable means binding the clencher edges together.

2. A tire composed of canvas strips and leather strips arranged in layers, cement between the canvas strips and leather strips, a filling of beeswax, Burgundy pitch and turpentine in the outer leather, cement securing the strips together, wires at the edges of the strips to form clenchers, and stitches fastening the edges of the strips together.

3. In a built-up tire, the combination with layers of canvas of different widths, of leather layers of different widths, the outermost of said layers containing wax and pitch, all cemented and stitched together and provided with clencher-edges.

In testimony whereof, I have hereunto set my hand at Los Angeles California, this 9th day of July, 1908.

PETER TRUDEAU.

In presence of—
  JAMES R. TOWNSEND,
  L. BELLE RICE.